UNITED STATES PATENT OFFICE.

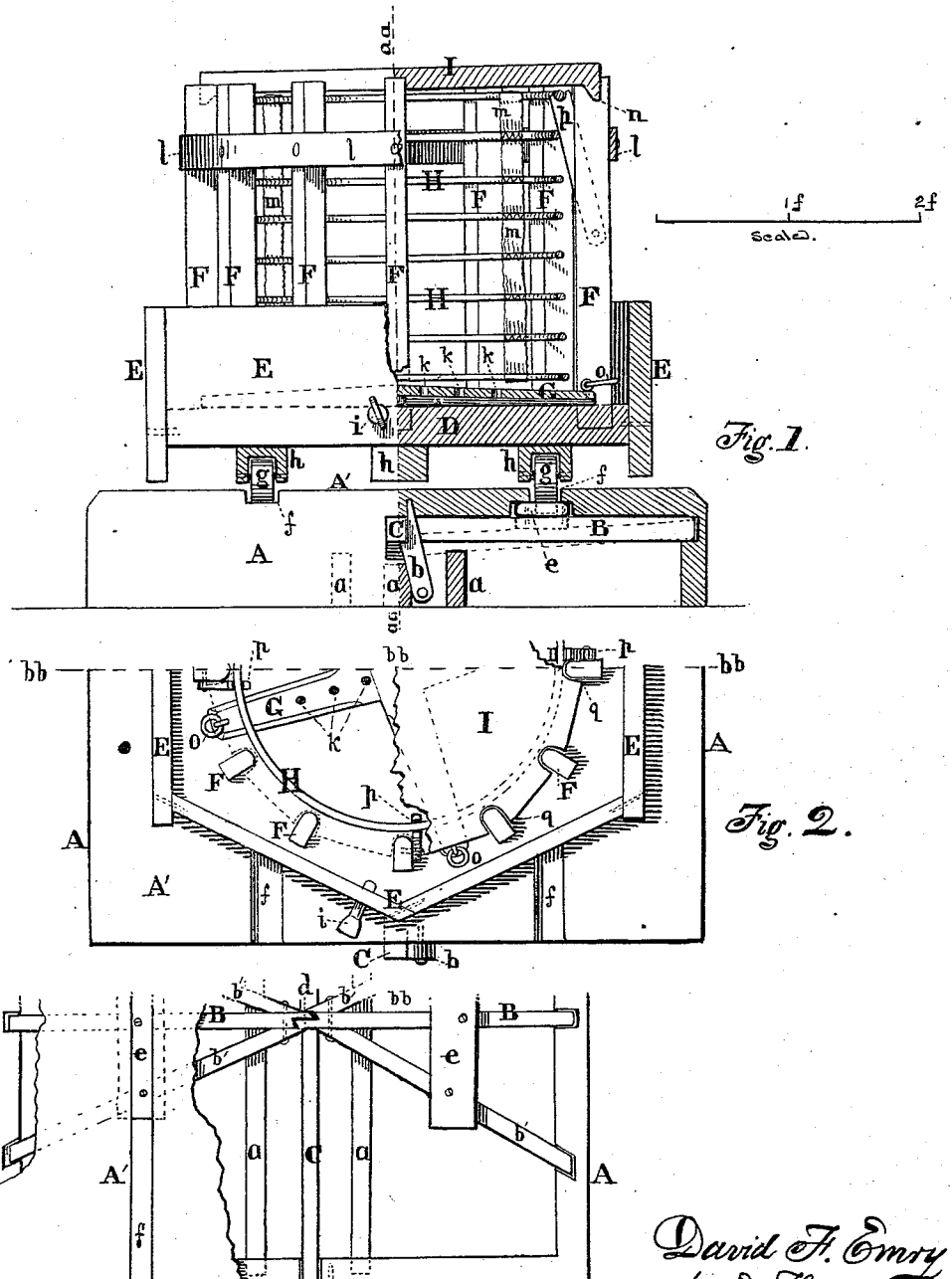

DAVID F. EMRY, OF CANTON, ILLINOIS.

IMPROVEMENT IN CIDER-PRESSES.

Specification forming part of Letters Patent No. 161,397, dated March 30, 1875; application filed February 12, 1875.

*To all whom it may concern:*

Be it known that I, DAVID F. EMRY, of Canton, in the county of Fulton and the State of Illinois, have invented an Improvement in Cider-Presses; and do hereby declare that the following is a full, clear, and exact description thereof, reference being had to the annexed drawings, making a part of this specification, in which like letters of reference refer to like parts, and in which—

Figure 1 represents an elevation, (half-sectional on the line *b b*, Fig. 2, to the center of the press;) Fig. 2, plan of front half of the press, having part of the disk or follower broken away to exhibit the cages H, cage-supports *p p*, and the lifting-arms G; Fig. 3, plan of the drop and levers under the grooved platform A A'.

The object of this invention is, first, to obviate the loss of time and labor in building up and tearing down the separate cheeses of pomace, or using sacks or matting, &c., to wrap around the same or each layer of fresh pomace as it is placed in the press; secondly, to furnish means to hoist the whole of the exhausted pomace from the press in one mass at the end of each application of the pressing-power; third, in placing rollers beneath the press to run in a grooved platform for the purpose of running the cider-press under the spout of the apple-mill on the one side, and under the power-press on the other side, of the platform; and the provision of a drop beneath the latter, which lets the rollers down to give the base of the cider-press a firm bearing upon the platform to receive the pressure.

The first of these objects is secured by providing as a receptacle for the fresh pomace a circular cage, composed of several horizontally-arranged hoops of wire, H, placed about four inches apart, one above another, connected at intervals by flexible bands *m*, which allow said hoops (or cage) to be pressed downward with the contained pomace under the follower or pressing-disk I. One piece of canvas or other diaphragm alone is used to retain said pomace, and is simply spread within said cage, leaving the edges to overlap the upper hoop of the cage. The latter is suspended within the circle of uprights F (which inclose the pomace) upon pivoted supports *p p* attached to the sides of the same, notched at their upper ends to receive the upper hoop, and which are pushed back to a vertical position when the cage H is filled to the top with pomace ready for the operation of the disk I or follower.

The second of these objects is attained by providing and laying at the bottom of the press, beneath the cage, a cross of four arms, G, furnished at the ends with a ring, *o*, or staple, to which to attach hooks or ropes of a hoisting-machine or pulley to raise the mass of exhausted pomace and inclosing-cage out of the press. Each of said arms G is provided on its under side with a longitudinal groove, *s*, running from the center of the cross to the end of the arm, and perforated with holes *k* from above leading into the groove for the escape of the expressed cider.

The third object is accomplished by mounting the press E upon small rollers *g g* placed in slots on the under side of the joists *h h* beneath the press-bottom D, and providing a grooved platform, A A', to serve at once as a support and as a tramway to conduct the said press to the apple-grinder on one side of the platform, and to the pressing power or screw on the other side. To let the press down onto the platform A, so as to rest the joists on the same, a drop or trap, *e e*, under each set of rollers *g g*, is employed beneath each groove *f* of the platform A A', each drop *e* being sustained upon a separate triple arrangement of bars B *b' b'*, which converge and rest their free ends upon a central lever, C, pivoted in one side of the platform-base, and supported at the free end by a catch, *b*, on the exterior of platform. The follower or disk I is provided with vertical marginal slots *q q*, each one corresponding with one of the circle of uprights F, which inclose the pomace, and its edge is extended downward by a lip or flange, *n*, to inclose and overlap the hoops of the cage H, and prevent the extension of the canvas or pomace at this point. The base of the press may be made in the ordinary form, with sides E E for retaining juice, but having an outlet-plug, *i*, and a solid bottom, D, from which rises the usual circle of uprights F F, &c., which are inclosed in an iron band, *l*.

The advantages of this cider-press consist, among others, in doing away with sacks, layers of straw, or other wrappers or diaphragms, to separate or confine the edges of each cheese of pomace during pressure, as in this press but one piece of canvas or sacking is required to line the cage H; secondly, in the portability of the press, particularly useful in expressing cider on a large scale, mounted, as it is, upon rollers which move in grooves in a platform communicating at either end with the apple-mill and the power-press; thirdly, by using three of these presses—one press receiving pomace, a second one under the power-press, and the third being emptied or having the pomace lifted out in one piece—great economy of time and labor is secured, particularly in time lost in building up and taking down the cheeses of pomace.

What I claim as my invention is—

1. In combination with a cider-press, the compressible cage for receiving pomace, composed of hoops H H, &c., arranged horizontally one above the other, connected by bands m m, &c.

2. In combination with the circle of uprights F, the pivoted supports p p, notched to support the cage H H, substantially as described.

3. The cider-press base, when constructed with bottom D, sides or hoop E, joists h h h, and rollers g g, &c., and circle of uprights F F, substantially as described.

4. In combination with the press E d h, and rollers g g, &c., the grooved platform A A', provided with the traps or drops e e, bars B b' b', levers C, and catch b, or its mechanical equivalent, substantially as described.

5. In combination with the circle of uprights F F, the disk or follower I, when constructed with slots q q on the edge to receive the respective uprights F, and a hanging lip, n, between each slot, to inclose the margin of the cage H, as described.

6. The pomace-lifter or cross G, provided with the radiating grooves s and perforations k k, and the rings o at the end of each arm, by which to raise said cross and cage, with the pomace, from out of the press at one operation, substantially as described.

7. The arrangement and construction of cross G, with rings o, cage H, supports p, uprights F, and follower I, with slots q, and rim n, as described.

8. The construction and arrangement of the grooved platform A A, roller-traps e e, bars B b' b', lever C, and catch b, as described.

In testimony that I claim the foregoing cider-press and platform I have hereunto set my hand this 2d day of February, 1875.

DAVID F. EMRY.

Witnesses:
   CLARENCE BARTON,
   JAMES M. MORSE.